March 11, 1930.　　　J. T. JANOSEK　　　1,750,309

LETTERING DEVICE

Filed Nov. 28, 1928

INVENTOR
JOSEPH T. JANOSEK
BY
Hugo A. Maerlender
ATTORNEY

Patented Mar. 11, 1930

1,750,309

UNITED STATES PATENT OFFICE

JOSEPH T. JANOSEK, OF CLEVELAND, OHIO, ASSIGNOR OF ONE-HALF TO ARTHUR OLIVER, OF CLEVELAND, OHIO

LETTERING DEVICE

Application filed November 28, 1928. Serial No. 322,561.

My invention relates to stencils for making alphabetical letters and numerals. More specifically it relates to a lettering device comprising but two stencils with which any and all letters and numerals may be conveniently made.

It has for one of its objects the creation of a practical stencil for use in the making of commercial signs and cards. It has a further object of simplifying such stencils, and reducing them to two in number by the joint use of which all of the letters of the alphabet as well as numerals can very easily be made uniform in size and contour.

While in the annexed drawings and following description only one particular form and use of my invention is described and illustrated the functional equivalents and means by which the same results may be obtained including variations in size are within the contemplation of my invention.

Figure 3:
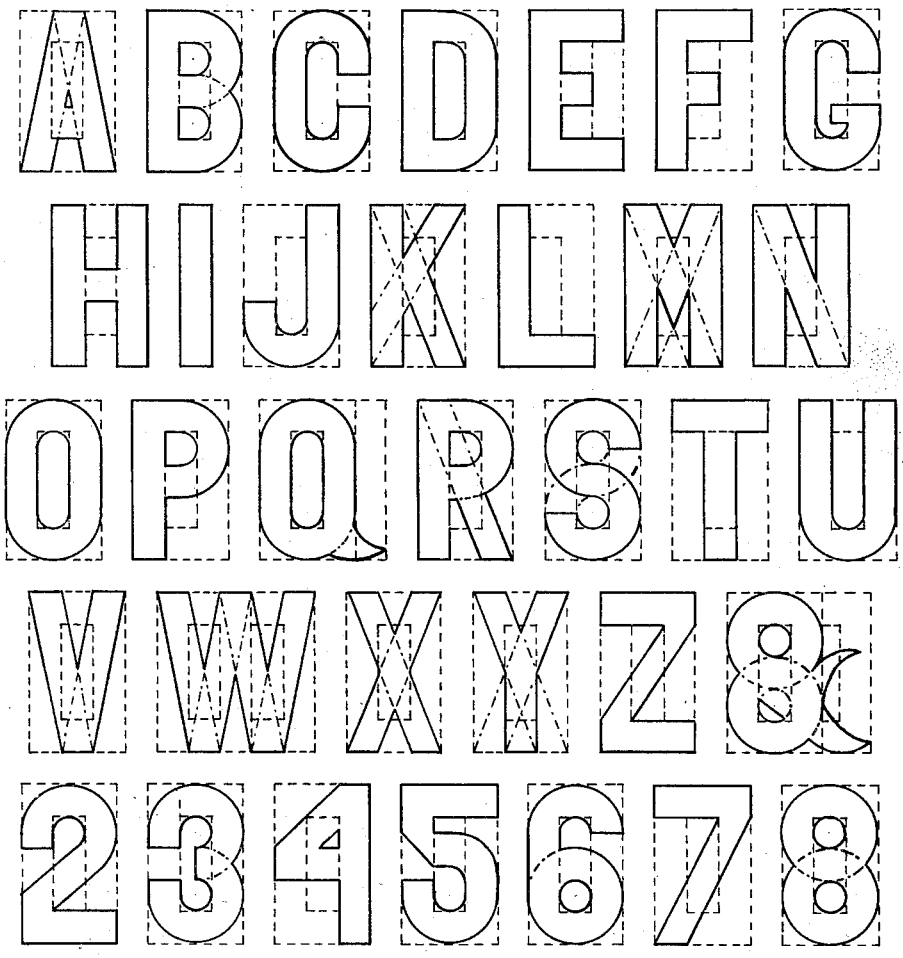
Figure 3 shows a group of letters and numerals and the manner in which they are formed, the position of the squaring tool being shown with dotted lines and that of all unused portions of the stencil superimposed being indicated by dot and dash lines.

The manner in which the square and round stencils are used to produce the figures and numerals shown in Figure 3 is as follows:—

The squaring tool is used first in outlining all letters and figures, which is preferably done faintly so that it may be later erased, and in making the letters of a word or sign all of these outlines should first be made. A guide line may be drawn first to insure that all the letters are even.

The letter A is formed by the use of the squaring tool alone. By means of the notches on the surface of the squaring tool into which its surface is divided in equal divisions any desired point may be marked off. The letters B, C, and D, afford opportunity for the use of the rounding tool. The letters E and F afford opportunity to use the notches on the surface of the squaring tool, while the letter G again affords use of the rounding tool.

Among the remaining examples shown in Figure 3 most of the letters and figures are self-explanatory. The letter S is formed entirely by the use of the rounding tool. The hooked segments of the letter Q and the figure & are likewise formed by the rounding tool in additional sections added by means of the squaring tool as clearly shown in Figure 3.

Figure 1:
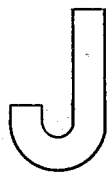
Figure 1 illustrates a plan view of the J-shaped rounding tool.
Figure 2:
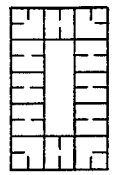
Figure 2 shows a similar view of the block O-shaped squaring tool.

The stencils may be made to produce any size letter desired, the surface of the squaring stencil in all cases having marks indicating equal sections of its length and width. Figure 1 is not shown, being the same as letter I. Figure 9 is the same as figure 6 reversed and figure 0 is the same as letter O. The use of these stencils facilitate the making of signs for all purposes and they have in addition, interesting and instructive qualities for educational purposes.

Having thus described my invention, what I claim and desire to secure by Letters Patent is:—

A lettering device comprising in combination a J-shaped rounding tool and a separate rectangular block letter O-shaped squaring tool having on its face notches at spaced intervals, said tools being equal in length, breadth and width.

Signed by me this 24th day of November, A. D. 1928.

JOSEPH T. JANOSEK.